(12) United States Patent
Fukuda et al.

(10) Patent No.: US 6,884,545 B2
(45) Date of Patent: Apr. 26, 2005

(54) ANODE MATERIAL FOR LITHIUM SECONDARY BATTERY, PROCESS FOR PRODUCTION THEREOF, AND LITHIUM SECONDARY BATTERY

(75) Inventors: Kenji Fukuda, Fukuoka (JP); Tadanori Tsunawaki, Fukuoka (JP); Tatsuo Umeno, Fukuoka (JP); Kohei Murayama, Fukuoka (JP); Yoshinori Yasumoto, Fukuoka (JP); Youichiro Hara, Fukuoka (JP)

(73) Assignee: Mitsui Mining Co., Ltd., Tokyo (JP)

( * ) Notice: Subject to any disclaimer, the term of this patent is extended or adjusted under 35 U.S.C. 154(b) by 371 days.

(21) Appl. No.: 10/163,595

(22) Filed: Jun. 7, 2002

(65) Prior Publication Data

US 2002/0197534 A1 Dec. 26, 2002

(30) Foreign Application Priority Data

Jun. 8, 2001 (JP) .................................... 2001-173985

(51) Int. Cl.⁷ .............................................. H01M 4/58
(52) U.S. Cl. ................... 429/231.8; 429/231.4; 423/448; 423/460; 423/445 R
(58) Field of Search ..................... 429/231.8, 231.4; 423/448, 445 R, 460

(56) References Cited

U.S. PATENT DOCUMENTS 6,432,583 B1    8/2002   Fukuda et al.

FOREIGN PATENT DOCUMENTS

| EP | 0 742 295 | * 11/1996 |
| JP | 5-121066 | * 5/1993 |
| JP | 2000-106182 | * 4/2000 |

* cited by examiner

Primary Examiner—Laura Weiner
(74) Attorney, Agent, or Firm—Oblon, Spivak, McClelland, Maier & Neustadt, P.C.

(57) ABSTRACT

An anode material for lithium secondary battery, which comprises graphite particles and a crystalline carbon coating layer formed thereon, wherein each graphite particle has a bent laminate structure inside, is produced by grinding a graphite of 5 mm or less in average particle diameter using an impact grinder to produce graphite particles of 100 μm or less in average particle diameter having a bent laminate structure inside each particle and then subjecting the graphite particles to chemical vapor deposition in a fluidized bed type reaction furnace to form a crystalline carbon coating layer on the graphite particles.

23 Claims, 5 Drawing Sheets

ANODE MATERIAL FOR LITHIUM SECONDARY BATTERY, PROCESS FOR PRODUCTION THEREOF, AND LITHIUM SECONDARY BATTERY

BACKGROUND OF THE INVENTION

1. Field of the Invention

The present invention relates to an anode material comprising nearly spherical graphite particles and crystalline carbon covering the graphite particles. More particularly, the present invention relates to an anode material which has a large capacity, a high potential and an excellent charge-discharge cycle property and which causes no decomposition of electrolytic solution; a process for production of such an anode material; and a lithium secondary battery using such an anode material.

2. Description of the Related Art

As electronic appliances have become smaller and lighter, the batteries used therein are required to have a high energy density. It is also required to develop a high-performance secondary battery allowing repeated charge and discharge, from the standpoint of resource saving.

In order to meet such requirements, lithium secondary battery was proposed and development thereof is being continued.

Lithium secondary battery is classified, based on the kind of electrolyte used therein, into lithium ion secondary battery, lithium polymer secondary battery, solid lithium secondary battery, etc. Currently, lithium ion secondary battery is used most widely in practical applications.

As the anode of lithium ion secondary battery, there are a graphite-based anode and a carbon-based anode. The graphite-based anode requires a short time for charging and is practical and shows a high coulomb efficiency; therefore, the graphite-based anode is a main stream currently.

The graphite-based anode has had problems in that (a) the graphite reacts with a solvent constituting an electrolytic solution, which reduces the coulomb efficiency of battery and (b) the graphite decomposes the solvent to give rise to generation of a gas. The particularly serious problem possessed by the graphite-based anode is that the graphite decomposes propylene carbonate (hereinafter abbreviated to PC) having an excellent solvent property at low temperatures, making it difficult to use PC for electrolytic solution.

To solve this problem, it was proposed to cover the surfaces of graphite particles with low-crystallinity carbon or amorphous carbon, each causing no PC decomposition.

Meanwhile, the present inventors previously found out that the above problem could be solved by uniformly covering the whole surfaces of graphite particles with crystalline carbon, and filed a patent (JP-A-2000-106182). The technique disclosed in the literature relates to an anode material which is a graphite-carbon composite material obtained by uniformly and completely covering the surfaces of graphite particles with crystalline carbon by chemical vapor deposition. When this anode material is used for production of an anode for lithium ion secondary battery, the anode obtained can reliably prevent the decomposition of PC or the like.

The reason for prevention of the decomposition of PC or the like is presumed to be that since the surfaces of graphite particles are covered with the [002] plane of crystalline carbon, the infiltration of solvent into anode material and resultant contact of solvent with graphite particles are prevented.

A battery produced using this anode material has a large discharge capacity and allows quick charge. Therefore, this anode material, as compared with conventional anode materials covered with low-crystallinity carbon, has superior electrode properties.

The anode of lithium ion secondary battery is produced by adhering an anode material to the surface of a conductive collector using a small amount of a binder, to form a thin anode material layer on the collector. The anode is subjected, during the production, to a treatment for increasing the density of the anode material layer, in order to obtain a large battery capacity. Specifically, the anode material layer is compressed using a means such as pressing, rolling or the like, to increase the density of the anode material layer (this density is hereinafter referred to as electrode density).

The graphite used in the above anode material (the graphite-carbon composite material) may be natural graphite or artificial graphite. Being inexpensive, natural graphite is economically superior to artificial graphite.

The graphite-carbon composite material as anode material, produced using natural graphite, however, has a high mechanical strength and therefore hardly causes deformation; hence, the composite material has a problem in that no sufficiently high electrode density is achieved by a means such as pressing, rolling or the like.

Further, the graphite particles obtained by grinding natural graphite are scaly in shape.

Natural graphite is fundamentally formed in a structure in which a large number of networks of carbon atoms, i.e. a large number of AB planes are laminated in a large thickness in the form of a lump. The bonding force between AB planes (the bonding force in the C axis direction) is far smaller than the bonding force within each AB plane. Therefore, in grinding of natural graphite, peeling between AB planes takes place preferentially unless a special countermeasure is taken in the grinding, and the resulting graphite particles are scaly.

Scaly graphite particles have a large specific surface area; therefore, they need a larger amount of carbon when a carbon layer is formed thereon to produce a graphite-carbon anode material. Use of a larger amount of carbon for carbon layer formation results in an anode material of higher strength; as a result, the anode material is resistant to deformation. This is because while graphite particles are relatively soft, the carbon layer covering them has a high mechanical strength. The fact that no sufficiently high electrode density is obtained, holds also when carbon of low crystallinity is used in the carbon layer.

Artificial graphite can be produced as nearly spherical particles, depending upon the production process. It can also be produced as particles low in anisotropy. Artificial graphite can be produced, for example, as spherical graphite particles having a structure in which disc-shaped graphite plates different in radius are laminated in the C axis direction, or as columnar graphite particles having a structure in which disc-shaped graphite plates equal in radius are laminated in the C axis direction.

Such artificial graphite, however, is generally expensive and low in crystallinity. Use of artificial graphite low in crystallinity as an anode material is not preferred because such graphite is small in charge and discharge capacities per unit mass of graphite.

Meanwhile, artificial graphite high in crystallinity has properties close to those of natural graphite. Therefore, artificial graphite high in crystallinity, when ground, becomes scaly (plate-like) particles as in the case of natural graphite.

SUMMARY OF THE INVENTION

The present inventors tried to grind highly crystalline graphite using a number of different grinders.

The primary crusher for obtaining graphite particles having an average particle diameter of 100 µm or more includes a jaw crusher, a gyratory crusher, a roll crusher, etc.

The fine grinding mill for obtaining graphite particles having an average particle diameter of 100 µm or less includes a roller mill, a rotary disc mill, a pan mill, a ring roll mill, an impact crusher, a vibration rod mill, a vibration disc mill, a vibration ball mill, a ball mill, a jet mill, etc.

All of these crushers or mills can give a strong shear force, a strong compression force and a strong impact and therefore can grind graphite in a short time. In many cases, however, the graphite particles obtained by grinding are scaly.

The inner construction of each graphite particle can be observed by an electron microscope. By observing, in particular, the graphite section vertical to the AB planes of graphite, streaks showing a laminate structure can be seen.

The inner construction of each scaly graphite particle is simple when observed by an electron microscope. When the graphite section vertical to the AB planes of graphite is observed, it is appreciated that the streaks showing a laminate structure are always linear and each scaly graphite particle is a laminate of plate-like graphite layers.

The inner construction which is such a laminate, is hereinafter called "laminate structure".

The present inventors found out that when graphite is finely ground using a vibration rod mill, a vibration disc mill or a vibration ball mill, spindle-like graphite particles are obtained exceptionally. This occurs because not only grinding but also compression molding are conducted, and the phenomenon is particularly striking when a vibration rod mill is used.

Even in the spindle-like graphite particles, a linear laminate structure is seen when their inner construction is observed by an electron microscope, and the AB planes of each graphite particle are approximately parallel to the length of the particle. That is, although the appearance of the graphite particles is spindle-like (changed from scaly), there is no change in the inner construction.

The present inventors ground highly crystalline graphite using various grinders in various grinding methods and investigated the change in inner construction by grinding. As a result, the present inventors found out that there was a change in the inner construction of graphite particles when an impact grinder having a relatively small grinding power was used. That is, a linear laminate structure changed to a curved laminate structure.

It was also found out that when a gas current was fed into the grinder together with the raw material graphite, the change to a curved laminate structure was striking. It was further found out that, by repeating the above grinding operation, spherical graphite particles could be obtained.

Furthermore, examination of the properties of the spherical graphite particles and examination of the appropriateness of an anode material for lithium secondary battery produced from the spherical graphite particles, revealed that the anode material was very suitable. The present invention has been completed based on the above findings and examinations.

Hence, the present invention aims at providing an anode material for high-performance lithium secondary battery, produced using nearly spherical graphite particles obtained by treating high-crystallinity graphite.

The anode material of the present invention is a graphite-carbon anode material obtained by forming a crystalline carbon layer on the surfaces of graphite particles, similarly to the anode material disclosed in the above-mentioned JP-A-2000-106182; however, the present anode material shows a higher performance because the raw material graphite used is beforehand treated so as to become spherical particles.

The present invention is as follows.

[1] An anode material for lithium secondary battery, having an average particle diameter of 100 µm or less, which comprises graphite particles and a crystalline carbon coating layer formed thereon, wherein each graphite particle has a bent laminate structure inside.

[2] An anode material for lithium secondary battery according to [1], wherein each graphite particle has a length-to-breadth ratio of 1 to 4.

[3] An anode material for lithium secondary battery according to [1], wherein the graphite particles are made of natural graphite particles.

[4] An anode material for lithium secondary battery according to [1], wherein the graphite particles have a lattice constant Co (002) of 0.670 to 0.672 nm as measured by an X-ray diffraction analyzer.

[5] An anode material for lithium secondary battery according to [1], wherein the graphite particles have an average particle diameter of 5 to 50 µm.

[6] An anode material for lithium secondary battery according to [1], wherein the graphite particles have a tap density of 0.6 to 1.4 $g/cm^3$.

[7] An anode material for lithium secondary battery according to [1], wherein the proportion of the crystalline carbon in the anode material is 1 to 14% by mass.

[8] An anode material for lithium secondary battery according to [1], which gives an electrode density of 1.40 to 1.70 $g/cm^3$ when made into an anode by pressing at a pressure of 100 to 400 $kg/cm^2$.

[9] An anode material for lithium secondary battery according to [1], which when made into an intercalation compound by intercalation of lithium ion and measured for $^7$Li-NMR spectrum using lithium chloride as a standard substance, gives a double peak spectrum comprising (a) a peak of lithium intercalated into graphite, showing a chemical shift at 40 to 50 ppm and (b) a peak of lithium intercalated into crystalline carbon, showing a chemical shift at 10 to 20 ppm.

[10] An anode material mixture for lithium secondary battery, having an average particle diameter of 100 µm or less, which comprises graphite particles and a crystalline carbon coating layer formed thereon, wherein the anode material according to any of [1] to [9] is contained in an amount of at least 10% by mass.

[11] A process for producing an anode material for lithium secondary battery set forth in any of [1] to [10], which comprises:

a first step of grinding a graphite of 5 mm or less in average particle diameter using an impact grinder to produce graphite particles of 100 µm or less in average particle diameter having a bent laminate structure inside each particle, and a second step of subjecting the graphite particles produced in the first step, to chemical vapor deposition in a fluidized bed type reaction furnace to form a crystalline carbon coating layer on the graphite particles.

[12] A process for producing an anode material for lithium secondary battery according to [11], wherein in the first step, the graphite of 5 mm or less in average particle diameter is fed into the impact grinder together with a gas current.

[13] A process for producing an anode material for lithium secondary battery according to [11], wherein in the second step, the chemical vapor deposition is conducted at 850 to 1,200° C.

[14] A lithium secondary battery produced using an anode material for lithium secondary battery set forth in any of [1] to [10].

The anode material of the present invention is a graphite-carbon composite material obtained by covering the surfaces of graphite particles with crystalline carbon and can prevent the decomposition of the solvent used in lithium secondary battery.

In the present anode material, the graphite particles are spherical in shape; therefore, the anode material has a high electrode density, making it possible to produce a lithium secondary battery of high energy density.

DETAILED DESCRIPTION OF THE INVENTION

Figure 1:
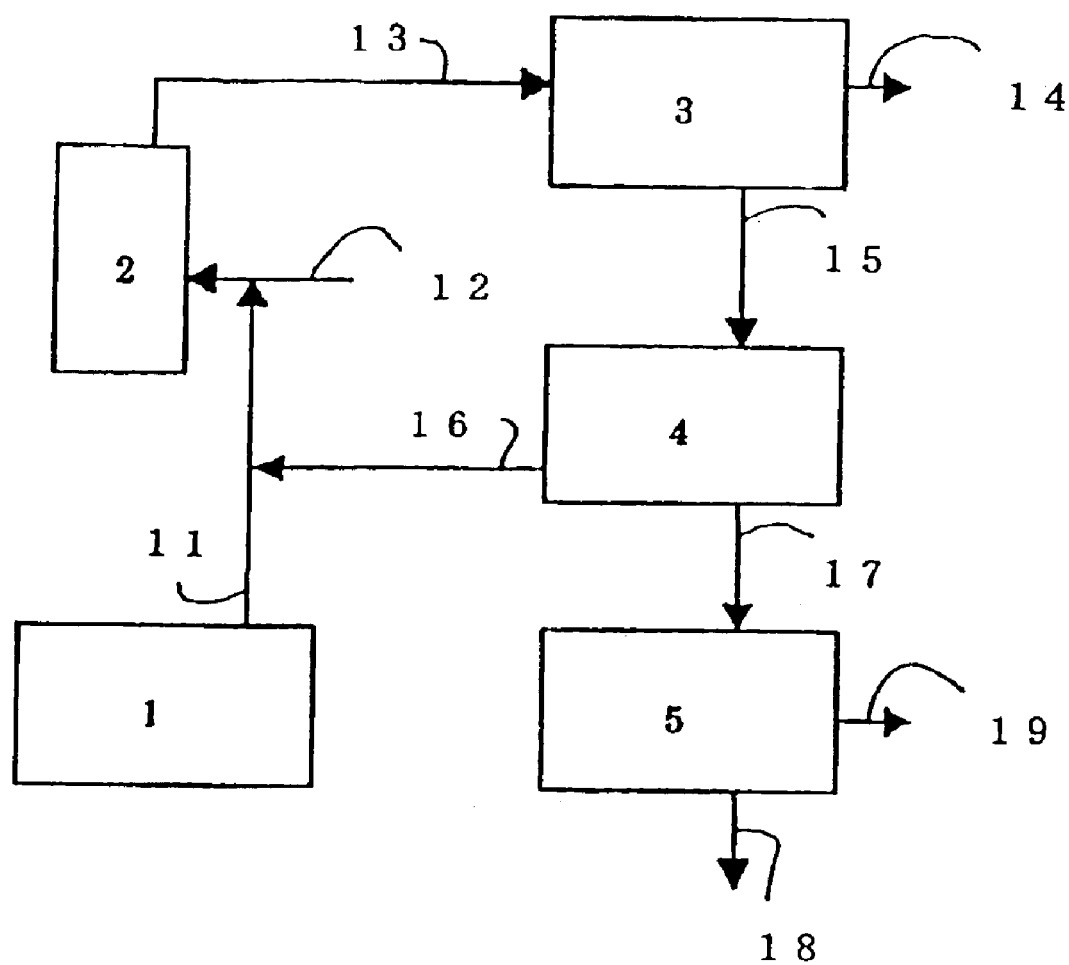
FIG. 1 is a flow chart showing an example of the process for producing graphite particles used in the present invention.

The present invention is described in detail below.

In order to explain the change in the inner construction of graphite particles, a case is considered in which a scaly (plate-like) graphite particle receives a compression force parallel to the AB plane of the particle.

First, the scaly (plate-like) graphite particle is deformed into a curved plate shape by receiving a compression force parallel to the AB plane.

With the repeated receiving of the compression force, the deformation of the graphite particle becomes striking, the compression force acts so as to bend the particle plate, and the two inner surfaces of the bent plate come to face each other.

With the further receiving of the compression force, the compression force acts so as to allow the two facing inner surfaces to adhere to each other, and finally the scaly (plate-like) graphite particle becomes a folded state.

The deformation of each graphite particle in actual grinding is not simple as above and is considered to take place in a complicated manner. For example, when scaly graphite particles repeatedly receive a compression force parallel to their AB planes, the direction of the action of the compression force is not constant as above and each end of the scaly graphite particles is considered to receive a force which acts so as to round the end.

It is further considered that complicated changes take place also in the steps up to the grinding into scaly graphite particles or between graphite particles. It is considered that by repeatedly receiving compression forces in various ways, graphite particles gradually turn into spherical particles.

Observation of the graphite particles after compression treatment indicates that their appearance is nearly spherical. Observation of the inner construction of such graphite particles using an electron microscope indicates that many of the streaks showing a laminate structure are curved and the laminate structure is very complicated. Further, many voids are seen inside each particle.

Such change of linear laminate structure into curved laminate structure by compression force is called "bent".

Thus, the spherical graphite particles used in the present invention are characterized by having, inside each particle, a bent laminate structure formed by a compression force, etc.

The spherical graphite particles used in the present invention are further characterized in that when a randomly selected section of graphite particle is observed, the presence of a laminate structure is always seen in the vicinity of the particle surface and, from the particle surface toward the particle center, a laminate structure curved along the roundness of the particle surface is seen.

This is considered to take place because the edges of each scaly graphite particle are rounded and the edges remaining on the particle surfaces become very little. Consequently, the graphite particles used in the present invention are nearly spherical in shape and each graphite particle surface is nearly the AB plane of graphite crystal.

As the impact grinder used for obtaining the graphite particles of the present invention, there can be mentioned, for example, a hammer mill and a pin mill. The pin mill is preferred particularly. The hammer mill has such a structure that a plurality of hammer is rotated inside a cylindrical casing. In this grinder, graphite particles are collided with each striking plate of hammer and each fixed plate of casing to conduct grinding.

The pin mill has such a structure that a plurality of pin is rotated inside a cylindrical casing. In this grinder, graphite particles are collided with each rotating pin and each fixed pin to conduct grinding.

The rotation speed of the rotating hammers or pins is preferably smaller than in ordinary grinding, in order to apply a relatively small impact. The linear speed of the striking plate of hammer or the rotating pin is preferably about 50 to 200 m/sec.

The grinding of graphite is conducted preferably by allowing the graphite to accompany a gas current. The feeding or discharging of graphite particles into or from grinder is conducted preferably by allowing the graphite particles to accompany a gas (e.g. air) current.

In order to allow graphite particles to accompany a gas current, the grinder preferably has such a structure that the raw material inlet is provided in the vicinity of the center of the shaft of the rotating hammers or rotating pins and the outlet of the ground material is provided at the outer circumference of the casing.

It is not certain why the grinding of graphite particles in the co-existence of a gas current is effective in-production of the graphite particles of the present invention. However, it is considered that, when plate-like graphite particles are in a gas current, the plate direction thereof becomes parallel to the flow direction of the gas and when these plate-like graphite particles are collided with, for example, the rotating pins, each end of each plate receives an impact.

Therefore, the plate-like graphite particles receive, at the AB planes, a compression force parallel thereto. As a result, the plate-like graphite particles are considered to give rise to deformation as mentioned previously and turn gradually into spherical graphite particles.

In producing the graphite particles used in the present invention, it is important to apply a relatively small impact repeatedly.

When grinding of graphite particles is conducted batchwise by allowing the graphite particles to accompany a gas current, repeated grinding of at least 10 times is necessary, and this is troublesome in some cases.

However, continuous grinding is easy. An example of continuous grinding is shown in FIG. 1. A raw material graphite 11 metered by a metering feeder 1 is transferred by air 12 and fed into an impact grinder 2 together with the air. The mixture of ground graphite and air 13 is sent into a bag filter 3, wherein separation into ground graphite and air is made. Air 14 is discharged outside. The ground graphite 15 separated by the bag filter 3 is sent into a sieve 4, classified therein, and divided into oversize particles 16 and undersize particles 17 of ground graphite.

The oversize particles 16 of ground graphite are sent into the impact grinder 2 together with the raw material graphite 11, and the above procedure is repeated.

The undersize particles 17 of ground graphite are sent into a classifier 5 to remove excessively ground graphite fine particles 19. Thereby, spherical graphite particles 18 according to the present invention are obtained.

Incidentally, feeding of air into the impact grinder 2 may be conducted by feeding, under pressure, air 12 using a fan provided at the feeding section of the grinder 2, or by sucking air 14 using a fan provided at the discharging section of the bag filter 3.

Thus, by treating graphite particles using the above continuous treatment apparatus into which an impact grinder is integrated, nearly spherical graphite particles according to the present invention can be obtained efficiently.

In the above apparatus, it is possible to appropriately change the proportion of the oversize particles 16 of ground graphite, to be returned to the raw material graphite 11, in order to control the proportion of spherical graphite particles in the graphite particles obtained.

The raw material graphite used in order to obtain the graphite particles of the present invention may be natural graphite or artificial graphite.

The graphite particles used in the present invention need to retain the function of highly crystalline graphite. Therefore, the raw material graphite, when it is an artificial graphite, preferably has a high graphitization degree. There is preferred, for example, a graphite obtained by a graphitization treatment at 2,600° C. or more, or a graphite obtained by adding boron or the like to accelerate graphitization.

The crystallinity of graphite is preferably 0.670 to 0.672 nm in terms of graphite lattice constant Co (002).

In the present process for producing graphite particles, raw material graphite is processed by a relatively small impact. Therefore, when graphite of high crystallinity is used as a raw material, the high crystallinity of raw material graphite remains in the graphite particles obtained, without being impaired at all. That is, the lattice constant Co (002) of the graphite particles after grinding remains at 0.670 to 0.672 nm.

The graphite particles of the present invention have an average particle diameter of preferably 100 $\mu$m or less, more preferably 5 to 50 $\mu$m.

Graphite particles having an average particle diameter of 5 to 50 $\mu$m can be obtained easily by beforehand subjecting the raw material graphite to be fed into an impact grinder, to coarse grinding so as to have particle diameters (in AB plane direction) of 5 mm or less.

The upper limit of the diameters of the graphite particles is preferably 50 $\mu$m in view of the thickness of the anode material layer formed on a collector. Too small diameters of the graphite particles result in a large specific surface area and consequently a large carbon amount required for coating of the graphite particles; therefore, the lower limit of the diameters of the graphite particles is preferably 5 $\mu$m.

The degree of sphericity of graphite particles can be expressed by the length-to-breadth ratio of particle. Therefore, when, in an arbitrarily selected section of graphite particle, the two axes intersecting perpendicularly at the gravity center, which give the largest length-to-breadth ratio, show a length-to-breadth ratio of close to 1, the particle's external shape is close to a true sphere. A particle having a length-to-breadth ratio of 4 or less can be said to be a spherical particle.

According to the process for producing the graphite particles used in the present invention, the graphite particles obtained can easily have a length-to-breadth ratio of 4 or less (1 to 4). The length-to-breadth ratio can be made 2 or less (1 to 2) by increasing the times of grinding treatment.

These graphite particles are spherical and therefore have a large tap density. While scaly graphite has a tap density of about 0.4 to 0.7 g/cc, the tap density of the graphite particles used in the present invention can be increased up to 0.6 to 1.4 g/cc.

The graphite particles used in the present invention are spherical and have a complicated inner construction. The graphite particles are further low in anisotropy depending upon the degree of sphericity. The low anisotropy is appreciated, for example, from the fact that when the graphite particles of the present invention are pressed into a molded material and electricity is allowed to flow through the molded material in the pressing direction to measure the specific resistance of the molded material, the specific resistance is only ½ to ⅕ of the specific resistance of a molded material obtained in the same manner using scaly graphite.

Therefore, when the present spherical graphite particles are used for production of the anode material of the present invention and the anode material is used for formation of an anode material layer on a collector, the anode material layer formed is low in orientation even when a compression force is applied in the formation by pressing or rolling, the infiltration of electrolytic solution into the anode material layer is easy, and an anode material layer of high conductivity in its thickness direction can be obtained.

When the anode material of the present invention is used in formation of an anode for lithium secondary battery, it is not necessary to use only the anode material of the present invention. That is, the anode material used may be an anode material mixture of (a) an anode material produced by forming a crystalline carbon layer on graphite particles having a length-to-breadth ratio of more than 4 or on scaly or spindle-like graphite particles having no bent laminate structure, according to, for example, the process of the present invention and (b) the anode material of the present invention.

Such an anode material mixture can be produced, for example, by using a graphite particles mixture produced as follows. That is, in the above-mentioned apparatus for production of spherical graphite particles, the proportion of the oversize particles 16 of ground graphite to be returned to the raw material graphite 11 is varied appropriately; thereby is obtained a graphite particles mixture low in the proportion of highly spherical graphite particles (small in length-to-breadth ratio); this graphite particles mixture may be used for production of the above anode material mixture.

When the spherical graphite particles are mixed with graphite particles produced by other process, to obtain a graphite particles mixture and the mixture is used for production of an anode material, the advantages and functions inherently possessed by the spherical graphite particles are exhibited as long as the spherical graphite particles are present about 10% by mass or more in the graphite particles mixture. Therefore, an anode material mixture containing 10% by mass or more of the present anode material produced using spherical graphite particles is included in the present invention.

The anode material of the present invention is a graphite-carbon composite material comprising graphite particles and a crystalline carbon coating layer formed thereon.

As the method for forming a crystalline carbon coating layer on graphite particles, chemical vapor deposition using a fluidized bed type reaction furnace is superior.

By vapor-depositing carbon on graphite particles according to the above method, the surfaces of graphite particles can be uniformly covered with a small amount of carbon. Further, the carbon of the coating layer can be made crystalline. Furthermore, the surfaces of graphite particles can be covered by the 002 plane (AB plane) of crystalline carbon.

In the fluidized bed type reaction furnace, buoyancy is imparted to graphite particles by a fluidizing gas fed from the bottom of the reaction furnace, whereby the graphite particles move vigorously and irregularly to form a fluidized bed. The fluidization of graphite particles can be achieved by the flow of the gas alone; however, a more stable fluidization can be obtained by employing in combination, a method of, for example, providing an agitator inside the reaction furnace to agitate the fluidized bed inside, or of using a vibrator to vibrate the reaction furnace per se.

In the fluidized bed, the volume of graphite particles is about 1.2 to 1.6 times the volume when allowed to stand. The bulk density of graphite particles in a fluidized state is desirably 0.1 to 0.5 g/cm$^3$.

The fluidized layer (the fluidized bed) shows high heat conduction. Therefore, in order to heat the fluidized layer to an intended chemical vapor deposition temperature, heating from outside the reaction furnace using an electric heater or the like is sufficient. However, the fluidizing gas may be preheated, as necessary. Chemical vapor deposition may be conducted batchwise or continuously.

The temperature of chemical vapor deposition is preferably 850 to 1,200° C., more preferably 950 to 1,150° C.

When the temperature of chemical vapor deposition is less than 850° C., the rate of carbon deposition is small and the crystallinity of deposited carbon is low; therefore, such a deposition temperature is not preferred.

As the temperature of chemical vapor deposition gets higher, the conversion of raw material organic substance into carbon is higher. However, when the temperature of chemical vapor deposition exceeds 1,200° C., deposited carbon grows on graphite particles in a fibrous state or an amorphous soot state and hardly grows in a filmy state.

In the present invention, since uniform formation of a crystalline carbon film is necessary, it is not preferred to employ a chemical vapor deposition temperature of higher than 1,200° C. Further, such a chemical vapor deposition temperature tends to allow the deposited carbon to have low crystallinity.

As the organic substance used in chemical vapor deposition as a carbon source, there are preferred mono- to tri-cycle aromatic hydrocarbons such as benzene, toluene, xylene, styrene, ethylbenzene, diphenylmethane, diphenyl, naphthalene, phenol, cresol, nitrobenzene, chlorobenzene, indene, coumarone, pyridine, anthracene, phenanthrene and the like; derivatives thereof; and mixtures thereof.

Of these, particularly preferred are monocycle aromatic hydrocarbons such as benzene, toluene, xylene, styrene and the like and their derivatives because they hardly generate tar during chemical vapor deposition.

There can also be used, singly or in admixture, gas light oil, creosote oil and anthracene oil, all obtained in coal tar distillation; petroleum-based cracked oils; tar oil obtained by naphtha cracking; and aliphatic hydrocarbons (e.g. methane, ethane, propane, butane, pentane and hexane) and alcohols derived therefrom.

There can further be used unsaturated bond-containing organic substances such as acetylene, ethylene, propylene, isopropylene, butadiene and the like.

The organic substance used in chemical vapor deposition as a carbon source is fed to the fluidized bed reaction furnace in a diluted form, i.e. a mixed gas with an inert gas.

As the inert gas, nitrogen, argon, etc. are mentioned. Nitrogen is particularly preferred for its availability and handleability.

The inert gas acts so as to discharge oxygen and the unreacted organic substance from the chemical vapor deposition system and also plays an important role as a fluidizing gas for forming a fluidized bed of graphite particles.

The concentration of organic substance in mixed gas has a large influence on the crystallinity and molecular orientation of deposited carbon.

The molar concentration of organic substance in mixed gas is preferably 2 to 50%, more preferably 5 to 33%.

By controlling the molar concentration in the above range, a carbon coating layer having intended crystallinity and molecular orientation can be easily formed on graphite particles by deposition.

When the molar concentration of organic substance in mixed gas is less than 2%, the crystallinity of deposited carbon is high, but the rate of carbon deposition is small and a long time is required for deposition. Therefore, such a molar concentration is not preferred.

Meanwhile, when the concentration of organic substance in mixed gas is more than 50%, the rate of carbon deposition is large, but the crystallinity of deposited carbon is low and deposited carbon grows in a fibrous or soot state and not a filmy state. Therefore, such a molar concentration is not preferred because uniform formation of a carbon layer on graphite particles is aimed at in production of the anode material of the present invention.

The amount of carbon deposited on graphite particles in chemical vapor deposition is preferably 1 to 14% by mass, more preferably 2 to 7% by mass based on the anode material obtained. By depositing carbon in an amount of 1% by mass or more, the resulting anode material can have an inhibitory action for the decomposition of solvent constituting electrolytic solution of battery. When the amount of deposited carbon is more than 14% by mass, individual graphite particles have a high mechanical strength and are resistant to flex. As a result, no high electrode density is obtainable even when roll pressing is conducted in anode production, and it is impossible to produce a battery of high energy density.

Next, description is made on the method used for evaluation of the structure of the anode material produced as above.

That is, lithium ion is intercalated into an anode material to be evaluated; the resulting material is measured for $^7$Li-NMR spectrum; using the measurement result, the anode material is evaluated.

Specifically, a battery is constituted using an anode material (a graphite-carbon composite material) to be evaluated and metallic lithium, and measurement of $^7$Li-NMR spectrum is made in a state that lithium ion has been intercalated into the graphite-carbon composite material.

An anode material giving, when measured for $^7$Li-NMR spectrum using lithium chloride as a standard substance (0 ppm), a double peaks spectrum comprising (a) an absorption peak showing a chemical shift at 40 to 50 ppm and (b) an absorption peak showing a chemical shift at 10 to 20 ppm, is preferred as an anode material for lithium ion secondary battery.

In the above, the absorption spectrum showing a chemical shift at 40 to 50 ppm is based on the lithium ion intercalated into highly crystalline graphite particles.

The absorption spectrum showing a chemical shift at 10 to 20 ppm is based on the lithium ion intercalated into crystalline carbon coating layer.

The presence and positions of these two absorption peaks and no presence of absorption peak at 90 to 120 ppm characterize the anode material of the present invention and are particularly important to show that the coating layer is made of crystalline carbon.

When the amount of deposited carbon (coating layer carbon) is small, the absorption spectrum at 10 to 20 ppm is not observed as a peak; however, a shoulder or a plateau is clearly observed at this position unlike the absorption spectrum of raw material graphite (amount of deposited carbon= 0% by mass).

Meanwhile, in the case of an anode material obtained by covering graphite particles with amorphous carbon, the $^7$Li-NMR spectrum obtained by intercalating lithium ion thereinto shows no absorption spectrum at 10 to 20 ppm and shows an absorption spectrum at 90 to 120 ppm.

Also, in the case of an anode material obtained by covering graphite particles with low-crystallinity carbon, the $^7$Li-NMR spectrum obtained by intercalating lithium ion thereinto shows, in some cases, absorption spectra at 10 to 20 ppm and at 90 to 120 ppm.

As to the method for producing an anode for lithium ion secondary battery using the anode material of the present invention, there is no particular restriction. An example of the method is shown below.

To the anode material of the present invention is added a solution of a binder (e.g. PVDF, i.e. polyvinylidene fluoride) dissolved in a solvent (e.g. 1-methyl-2pyrrolidone), and the mixture is kneaded thoroughly. Thereby can be prepared a high-concentration slurry containing 40% by mass or more of the anode material.

This anode material slurry is coated on a collector made of a metal foil (e.g. copper foil) in a thickness of 20 to 100 μm, using a doctor blade or the like. The coated collector is dried, whereby the anode material is adhered to the metal foil collector.

The resulting anode is pressed by a roll press or the like to obtain higher adhesion and a higher electrode density.

As the binder, there can be used a known material such as pitch, rubber, synthetic resin or the like. Of these, PVDF, carboxymethyl cellulose (CMC) and SBR latex are most suitable.

The mixing ratio (mass ratio) of the anode material and the binder is desirably 100:2 to 100:20.

The electrode density is controlled to 1.4 to 1.7 g/cm$^3$. This density corresponds to an electrode porosity (space) of 20 to 36 volume %, and this porosity is most appropriate for holding of electrolytic solution.

The above electrode density of the present anode material can be achieved when the amount of deposited carbon in the present anode material is 14% by mass or less.

In conventional anode materials obtained by coating scaly (plate-like) graphite particles with carbon, when the amount of coating carbon is 14% by mass or less, the coating of graphite particles is incomplete and the inhibitory action against decomposition of electrolytic solution, which is a primary purpose of formation of carbon coating layer, is insufficient. Further, coulomb efficiency is low and no sufficient electrical properties are obtained. Furthermore, there appears the above-mentioned problem of orientation of anode material caused by pressing or rolling.

In the present invention using spherical graphite particles, however, the specific surface area of the spherical graphite particles can be made very small; therefore, the amount of coating carbon can be made as small as 14% by mass or less with no sacrifice of electrical properties. As a result, an electrode density of 1.4 to 1.7 g/cm$^3$ can be obtained.

In the industrial production line of battery, a roll press is used often for control of electrode density by pressing. In this case, pressing of anode material is conducted by the line pressure of roll. However, in evaluation of anode material, control of electrode density is made more easily by ordinary pressing by plate. The above pressing by roll press corresponds to pressing by plate at a plane pressure of 100 to 400 kg/cm$^2$.

Therefore, the most preferred pressing conditions for the present anode material is such that pressing by plate at 100 to 400 kg/cm$^2$ gives a density of 1.4 to 1.7 g/cm$^3$.

There is no particular restriction as to the cathode material used when a lithium secondary battery is produced using an anode produced from the present anode material. However, the cathode material can be exemplified by lithium-containing compounds known to those skilled in the art, such as LiCoO$_2$, LiNiO$_2$, LiMn$_2$O$_4$ and the like, and mixtures thereof.

To a powdery cathode material is added a conductive material as necessary; the mixture is sufficiently kneaded together with a binder solution, etc.; then, the kneaded material is subjected to molding together with a collector, to obtain a cathode.

There is no particular restriction as to the separator, either. A separator made of a known material such as polypropylene, polyethylene or the like can be used.

As the non-aqueous solvent which is a main solvent of electrolytic solution, there can be mentioned known aprotic solvents of low dielectric constant, capable of dissolving a lithium salt used as an electrolyte.

There can be used, singly or in admixture of two or more kinds, solvents such as ethylene carbonate (hereinafter abbreviated to EC), dimethyl carbonate (hereinafter abbreviated to DMC), methyl ethyl carbonate (hereinafter abbreviated to MEC), propylene carbonate, diethylene carbonate, acetonitrile, propionitrile, tetrahydrofuran, γ-butyrolactone, 2-methyltetrahydrofuran, 1,3-dioxolane, 4-methyl-1,3-dioxolane, 1,2-dimehtoxyethane, 1,2-diethoxyethane, diethyl ether, sulfolane, methylsulfolane, nitromethane, N,N-dimethylformamide, dimethyl sulfoxide and the like.

The lithium salt used as an electrolyte includes $LiClO_4$, $LiAsF_5$, $LiPF_6$, $LiBF_4$, $LiB(C_6H_5)_4$, LiCl, LiBr, $CH_3SO_3Li$, $CF_3SO_3Li$, $Li(CF_3SO_2)_2N$, $Li(C_2F_5SO_2)_2N$, etc. These salts can be used singly or in admixture of two or more kinds.

As the electrolyte, there can also be used a gel electrolyte obtained by making the above non-aqueous solvent (main solvent) and the above electrolyte into a gel; a polymer electrolyte of polyethylene oxide, polyacrylonitrile or the like; etc.

It is also possible to produce a solid lithium secondary battery using a solid electrolyte. The constitution of such a secondary battery is known.

The present invention is described more specifically below by way of Examples.

EXAMPLES

Measurement of properties was made as follows.

[Specific Resistance]

A given amount of a sample (graphite particles or anode material) was placed in a polyvinyl chloride-made pipe having a sectional area of 2 cm², closed with a copper-made cover at one end. A copper-made cylinder was inserted into the pipe from the other end of the pipe, and the sample in the pipe was pressed at a given pressure. In this state, the sample was measured for thickness (t) using a slide calipers. Further, the electric resistance (R) between the copper-made cover and the copper-made cylinder was measured using an electric resistance tester, AX-115A produced by Adex Co. Specific resistance (SR) was calculated using the following formula.

$$SR=2R/t (\Omega \cdot cm)$$

[Lattice Constant Co (002)]

An X-ray diffractometer, X'Pert-MPD produced by philips Co. was used. A Cu—$K_\alpha$ line was monochromatized with Ni using a monochrometer; a high-purity silicon was used as a standard substance; and measurement was made according to the Gakushin method.

[Tap Density]

A sample was placed in a 100-ml glass-made messcylinder, followed by tapping. When continued tapping gave no change in sample volume, the sample volume was measured. A value obtained by dividing the sample mass by the sample volume was taken as the tap density of the sample.

[Average Particle Diameter]

Measurement was made using a laser diffraction type particle size tester, SALD 1000 produced by Shimadzu Corporation.

[External Shape of Particle]

The external shape of a sample was observed using a scanning type electron microscope produced by Japan Electron Optical Laboratory.

[Inner Construction and Length/Breadth of Particle]

A sample (graphite particles) was embedded in a resin; the resulting material was polished; the polished material was coated, at the surface, with Au in a small thickness; then, the inner construction of the graphite particles was observed using a field-emission type scanning electron microscope, S-4300 produced by Hitachi, Ltd. The image observed was analyzed by an Image analyzer, Luzex IIIU produced by K.K. Nireko to determine the length/breadth of the graphite particles.

[Electrode Density]

A slurry (anode material concentration=40% by mass, binder concentration=4% by mass) was prepared using PVDF (PVDF-1100, a product of Kureha Chemical Industry Co., Ltd.) as a binder and N-methylpyrrolidone as a solvent. The binder content in dried slurry was 9.0% by mass.

The slurry was coated on a copper foil in a thickness of about 130 $\mu$m using a doctor blade, followed by drying. The resulting material was pressed at a given pressure using a monoaxial press.

From the pressed material was cut out a sample of 2.5 cm², and the sample was measured for thickness (excluding the thickness of the copper foil) using a micrometer. The mass of the sample was divided by the area and the thickness, whereby an electrode density was obtained.

[$^7$Li Solid NMR]

A solid NMR apparatus, DSX 300 wb produced by Bruker Co. was provided with a multi-nucleus broad probe head, and measurement was made using an aqueous lithium chloride solution as a standard.

[Specific Surface Area]

Using a high-precision automatic gas adsorption apparatus, BELSORB 28 produced by Nippon Bell Co., the amount of nitrogen adsorbed was measured at a liquid nitrogen temperature according to the multi-point method; and specific surface area was calculated using the BET method.

[Amount of Coated (Deposited) Carbon]

A thermogravimetric analyzer, TGA-50 produced by Shimadzu Corporation was used. An anode material was measured for reduced amount of mass under an air current, and a reduced mass amount portion clearly different from the reduced mass amount portion of the graphite component of the anode material was taken as the amount of coated carbon.

Examples 1 to 3

(Production of Graphite Particles)

Graphite particles produced in China, having an average particle diameter of 3.3 mm in the AB plane direction and a lattice constant Co (002) of 0.6707 nm were used as a raw material graphite, and the graphite particles were subjected to fine grinding and converted into spherical graphite particles, using an impact grinder (first step)

A pin mill produced by Leche Co. was used as the grinder. The pins fitted to the rotor were arranged so that the outermost pins were on a circle of 9.5 cm in diameter. The rpm of the rotor was set at 20,000. At this time, the linear speed of the outermost pins was about 100 m/sec.

The raw material graphite was fed at a rate of 200 g/min by allowing the graphite to be carried by the suction wind generated by the grinder. The ground graphite particles were collected by a cyclone and a bag filter. The collected graphite particles were again fed into the grinder at a rate of 200 g/min by allowing them to be carried by the above suction wind.

This grinding operation was repeated 20 times in total to obtain spherical graphite particles.

The spherical graphite particles obtained had the following properties.

Average particle diameter: 25.4 $\mu$m

Tap density: 0.87 g/cc

Lattice constant Co (002): 0.6707 nm

Specific resistance: 0.0051 $\Omega$·cm (pressing pressure: 300 kg/cm²)

Figure 2:
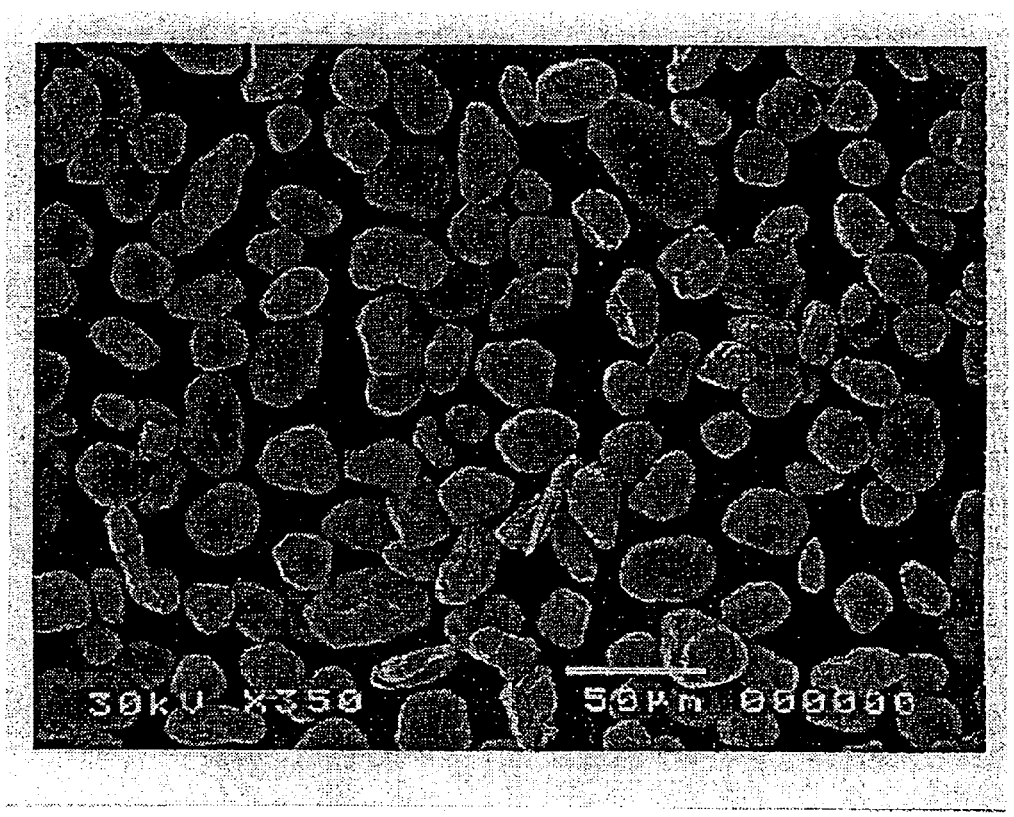
FIG. 2 is a micrograph showing the external shape of the graphite particles produced in Example 1.

The graphite particles obtained had a spherical external shape as shown in FIG. 2. The length-to-breadth ratios were 2 or less and many ratios ranging from 1.2 to 1.6 were observed.

Figure 3:
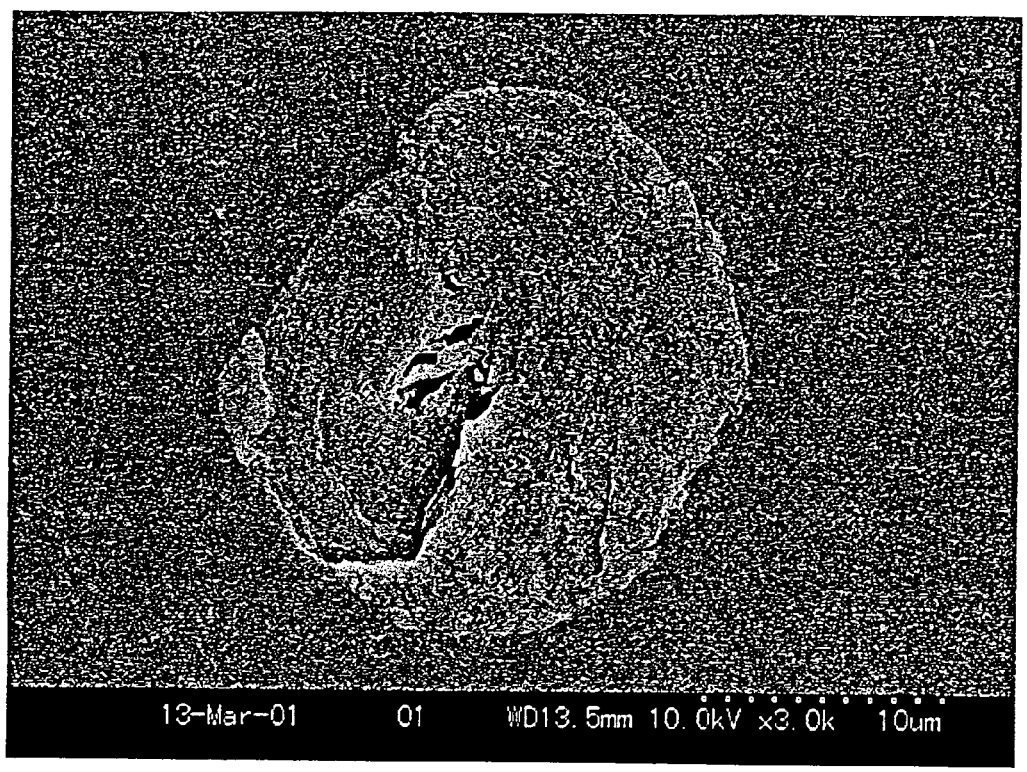
FIG. 3 is a micrograph showing the internal shape of a graphite particle produced in Example 1.
Figure 4:
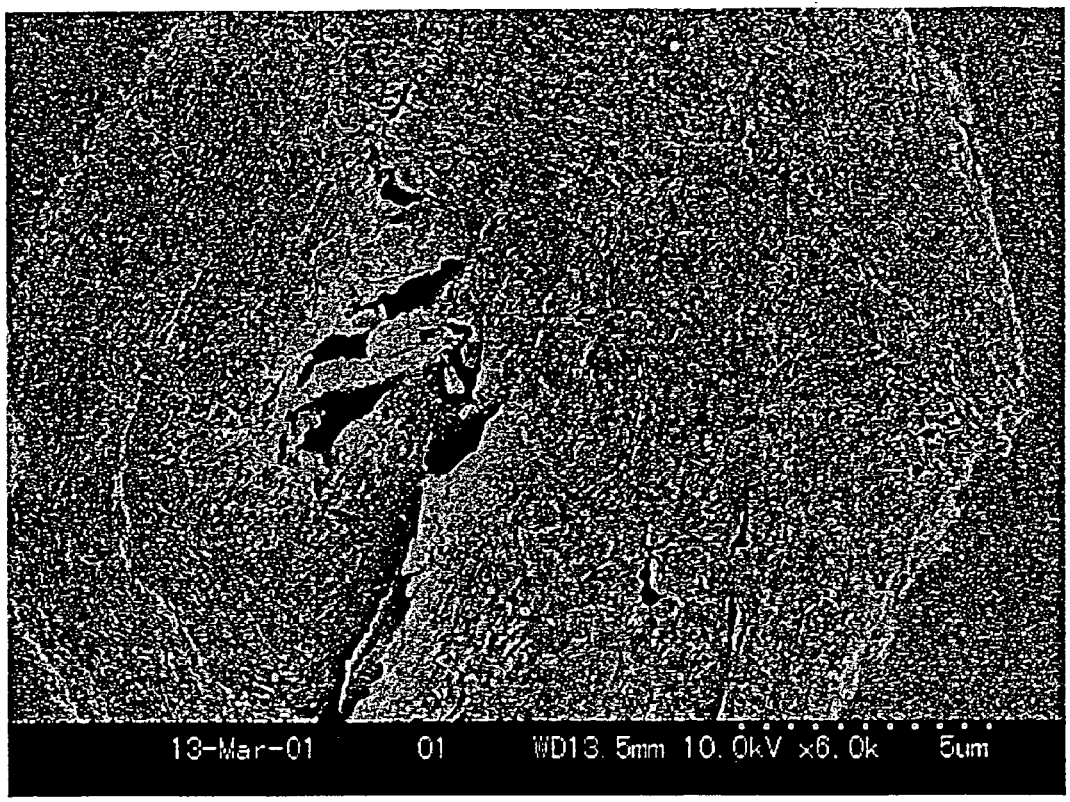
FIG. 4 is an enlarged micrograph showing the internal shape of a graphite particle produced in Example 1.

An example of the electron micrograph of the inner construction of the graphite particles obtained is shown in FIG. 3 and FIG. 4. FIG. 3 is a photograph showing one whole graphite particle and FIG. 4 is a partly enlarged photograph thereof.

From these photographs it could be confirmed that each graphite particle of Example 1 had a bent laminate structure inside and that the surface of each graphite particle roughly agreed to the AB plane of graphite crystal.

(Production of Anode Materials)

60 kg of the spherical graphite particles produced above were fed into a fluidized bed type reaction furnace. While nitrogen was allowed to flow from the bottom of the furnace toward the top at a rate of 50 l/min, the temperature of the furnace inside was increased to 1,000° C. Then, a nitrogen gas containing toluene as a carbon source was introduced into the fluidized bed, whereby the graphite particles produced in the first step were subjected to chemical vapor deposition for a given length of time. The concentration of toluene was 40 mole % (second step).

53-$\mu$m undersize particles samples of the thus-obtained anode materials were subjected to evaluation tests under the conditions shown in Table 1. The results are shown in Table 2.

Incidentally, Comparative Example 1 of Table 2 indicates a case when the above-obtained graphite particles were not subjected to chemical vapor deposition and per se used as an anode material.

Figure 5:
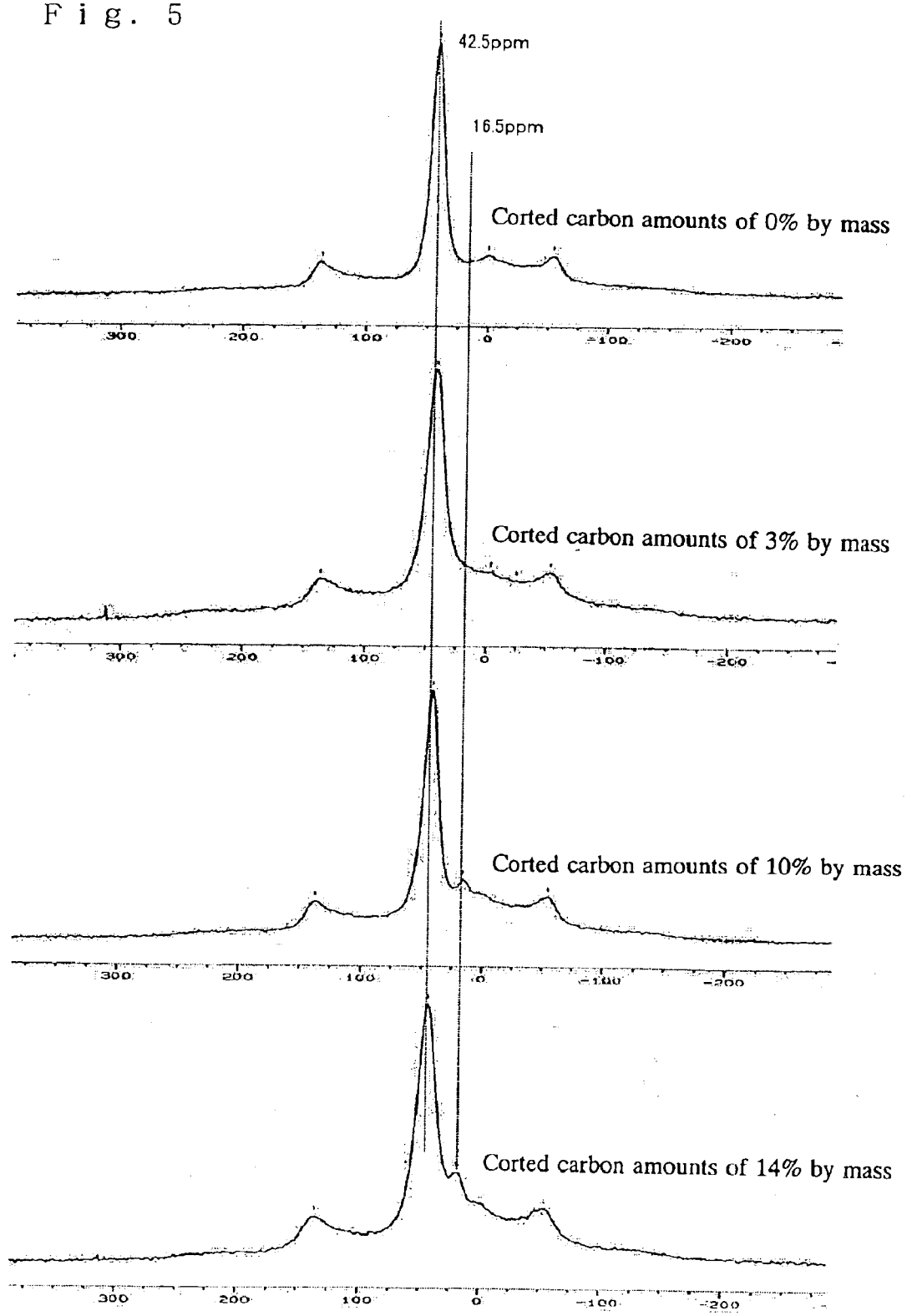
FIG. 5 is the NMR spectra of lithium ion-intercalated anode materials. (A), (B) (C) and (D) are the NMR spectra obtained in Comparative Example 1, Example 1, Example 2 and Example 3, respectively.

The NMR spectra of the above anode materials are shown in FIG. 5. The anode materials having coated carbon amounts of 10% and 14%, of Examples 2 and 3, respectively showed signal peaks at around 17 ppm.

The anode material having a coated carbon amount of 3%, of Example 1 showed no signal peak at around 17 ppm. However, the anode material, as compared with the anode material of 0% coated carbon amount, of Comparative Example 1, showed a higher signal intensity and indicated the presence of $^7Li^+$ signal.

Therefore, it is appreciated that each coated carbon of the anode materials of Examples 1 to 3 is crystalline carbon.

Electrode density decreased with an increase in coated carbon amount. However, when the coated carbon amount was 14% or less, electrode densities of 1.40 to 1.70 g/cm$^3$ could be obtained with a compression force of 100 to 400 kg/cm$^2$.

In the charge-discharge test using PC as the solvent of electrolytic solution, decomposition of solvent could be sufficiently prevented when the coated carbon amount was at least 3%.

In Comparative Example 1 of 0% coated carbon amount, measurement was presumed before the test to be impossible owing to the decomposition of solvent. However, a coulomb efficiency of 88% was shown.

This indicates that although the anode material of Comparative Example 1 has no practical applicability but had a certain degree of inhibitory action against solvent decomposition owing to the sphericity of the graphite particles used.

The reason is considered to be that the edges of scaly graphite particles were rounded and the number of edges on particle surface decreased and, as a result, the surface of each graphite particle roughly became the AB plane of graphite crystal.

The load properties of each anode material are shown as discharge capacities when various discharge rates were used. 0.2 C, 1.0 C, 2.0 C and 3.0 C show that discharge was made in 5 hours, 1 hour, 30 minutes and 20 minutes, respectively.

It is seen from Table 2 that the feature of the graphite-based anode material of the present invention allowing quick charge and discharge is exhibited fully.

Comparative Examples 2 to 3

(Production of Graphite Particles)

The same raw material graphite as used in Example 1 was ground using a jet mill produced by Condax Co. Satisfactory fine grinding was achieved by one time of grinding; however, the particles obtained were scaly and had the following properties.

Average particle diameter: 8.71 $\mu$m

Tap density: 0.47 g/cc

Lattice constant Co (002): 0.6707 nm

Specific resistance: 0.0135 $\Omega \cdot$cm (Pressing pressure: 300 kg/cm$^2$)

When the graphite particles of Example 1 to 3 and those of Comparative Examples 2 and 3 are compared with respect to their properties, the graphite particles of Examples 1 to 3 had higher tap densities owing to their sphericity. Further, they had lower anisotropy also owing to their sphericity and accordingly had significantly low specific resistances.

(Production of Anode Materials)

The above-produced scaly graphite particles were subjected to chemical vapor deposition under the same conditions as in Example 1. The coated carbon amounts were 3% by mass (Comparative Example 2) and 16% by mass (Comparative Example 3).

The obtained anode materials (53-$\mu$m undersize particles) were subjected to evaluation tests under the conditions shown in Table 1. The results are shown in Table 3.

In the case of using spherical graphite particles, solvent decomposition could be sufficiently prevented at a coated carbon amount of 3% by mass; meanwhile, in the case of using scaly graphite particles of Comparative Example 2 in which the coated carbon amount was also 3% by mass, prevention of solvent decomposition was insufficient.

It is appreciated from Comparative Example 3 that when the coated carbon amount was increased to 16% by mass, solvent decomposition could be sufficiently prevented but electrode density decreased, making it impossible to obtain a high energy density per unit volume.

TABLE 1

| Cell | Two electrodes (reference electrode: metal lithium) |
|---|---|
| Sample amount | 30 mg |
| Electrode area | 2.5 cm$^2$ |
| Binder | PVDF: 9% by weight |
| Solvent used for preparation of graphite slurry | 1-Methyl-2-pyrrolidone |
| Drying conditions | Allowed to stand for 4 hours in an argon atmosphere in a glow box |
| Electrolyte, concentration | LiPF$_6$, 1 mol/l |
| Solvent system | EC/DMC = 1/2 (by volume) or PC/EC/DMC = 2/1/1 (by volume) |
| During constant-current charge | |
| Current | 1 mA |
| Current density | 0.4 mA/cm$^2$ |
| During constant-voltage charge | |
| Voltage | 1 mV |
| Time | 1 hr |
| Measurement range of discharge capacity | 1 mV to 1.5 V |

TABLE 2

|  | Comp. Ex. 1 | Ex. 1 | Ex. 2 | Ex. 3 |
|---|---|---|---|---|
| Coated carbon amount (wt. %) | 0 | 3 | 10 | 14 |
| Specific resistance ($\Omega \cdot cm$) | 0.0051 | 0.0039 | 0.005 | 0.005 |
| Press pressure (300 kg/cm$^2$) |  |  |  |  |
| Specific surface area (m$^2$/g) | 4.6 | 2.7 | 1.8 | 1.5 |
| Average particle diameter ($\mu$m) | 25.4 | 25.5 | 25.7 | 26.2 |
| Tap density (g/cc) | 0.87 | 0.96 | 0.99 | 1.03 |
| XRD Co (002) (nm) | 0.6707 | 0.6707 | 0.6707 | 0.6707 |
| $^7$Li-NMR |  |  |  |  |
| Signal 1 chemical sift (ppm) | Not detected | 16.0 | 16.4 | 17.7 |
| Signal 1 relative intensity (%) | 0.0 | 3.0 | 8.9 | 13.5 |
| Signal 2 chemical sift (ppm) | 42.3 | 42.0 | 43.0 | 42.9 |
| Signal 2 relative intensity (%) | 100.0 | 97.0 | 91.1 | 86.5 |
| Electrode density (g/cc) Press pressure |  |  |  |  |
| 0.0 ton/cm$^2$ | 0.92 | 0.98 | 1.02 | 1.08 |
| 0.2 ton/cm$^2$ | 1.77 | 1.53 | 1.33 | 1.30 |
| 0.4 ton/cm$^2$ | 1.98 | 1.76 | 1.52 | 1.41 |
| 0.6 ton/cm$^2$ | 2.20 | 1.87 | 1.62 | 1.49 |
| 0.8 ton/cm$^2$ | 2.20 | 1.92 | 1.68 | 1.58 |
| 1.0 ton/cm$^2$ | 2.21 | 1.97 | 1.73 | 1.60 |
| Test results of first charge-discharge [PC/EC/DMC = 2/1/1 (vol.)] |  |  |  |  |
| Charge capacity (mAh/g) | 408 | 393 | 383 | 381 |
| Discharge capacity (mAh/g) | 359 | 363 | 360 | 360 |
| Initial coulomb efficiency (%) | 88.0 | 92.4 | 94.0 | 94.5 |
| Test results of load properties [EC/DMC = 1/2 (vol.)] |  |  |  |  |
| Electrode density (g/cc) | 1.5 | 1.5 | 1.5 | 1.5 |
| Discharge capacity (mAh/g) |  |  |  |  |
| First charge-discharge 0.2 C | 363 | 362 | 361 | 356 |
| Second charge-discharge 0.2 C | 365 | 362 | 361 | 355 |
| Third charge-discharge 1.0 C | 365 | 367 | 362 | 355 |
| Fourth charge-discharge 2.0 C | 332 | 352 | 352 | 345 |
| Fifth charge-discharge 3.0 C | 285 | 323 | 338 | 309 |

TABLE 3

|  | Comp. Ex. 2 | Comp. Ex. 3 |
|---|---|---|
| Coated carbon amount (wt. %) | 3 | 16 |
| Specific resistance ($\Omega \cdot cm$) Press pressure (300 kg/cm$^2$) | 0.0154 | 0.0151 |
| Specific surface area (m$^2$/g) | 4.5 | 2.3 |
| Average particle diameter ($\mu$m) | 18.2 | 21.1 |
| Tap density (g/cc) | 0.78 | 0.91 |
| XRD Co (002) (nm) | 0.6707 | 0.6707 |
| $^7$Li-NMR |  |  |
| Signal 1 chemical sift (ppm) | 15.1 | 15.0 |
| Signal 1 relative intensity (%) | 3 | 16 |
| Signal 2 chemical sift (ppm) | 42.9 | 42.9 |
| Signal 2 relative intensity (%) | 97 | 84 |
| Electrode density (g/cc) Press pressure |  |  |
| 0.0 ton/cm$^2$ | 0.87 | 0.90 |
| 0.2 ton/cm$^2$ | 1.33 | 1.169 |
| 0.4 ton/cm$^2$ | 1.55 | 1.241 |
| 0.6 ton/cm$^2$ | 1.64 | 1.316 |
| 0.8 ton/cm$^2$ | 1.70 | 1.356 |
| 1.0 ton/cm$^2$ | 1.74 | 1.414 |
| Test results of first charge-discharge [PC/EC/DMC = 2/1/1 (vol.)] |  |  |
| Charge capacity (mAh/g) |  | 385 |
| Discharge capacity (mAh/g) | Decomposed | 358 |
| Initial coulomb efficiency (%) |  | 93.0 |
| Test results of load properties [EC/DMC = 1/2 (vol.)] |  |  |
| Electrode density (g/cc) | 1.5 | 1.25 |
| Discharge capacity (mAh/g) |  |  |
| First charge-discharge 0.2 C | 364 | 359 |
| Second charge-discharge 0.2 C | 364 | 362 |
| Third charge-discharge 1.0 C | 364 | 362 |
| Fourth charge-discharge 2.0 C | 345 | 332 |
| Fifth charge-discharge 3.0 C | 317 | 290 |

What is claimed is:

1. An anode material for lithium battery comprising graphite particles, having an average particle diameter of 100 $\mu$m or less, and wherein each of said graphics particles comprises a crystalline carbon coating layer formed thereon, and wherein the inside of each of said graphite particles has one nearly spherically bent laminate structure which is curved along the circumference of a surface of each of said graphite particle toward the graphite particle center and a crystal plane at each graphite particle surface is approximately an AB plane.

2. The anode material according to claim 1, wherein each graphite particle has a length-to-breadth ratio of 1 to 4.

3. The anode material according to claim 1, wherein the graphite particles comprise natural graphite particles.

4. The anode material according to claim 1, wherein the graphite particles have a lattice constant Co (002) of 0.670 to 0.672 nm as measured by an X-ray diffraction analyzer.

5. The anode material according to claim 1, wherein the graphite particles have an average particle diameter of 5 to 50 $\mu$m.

6. The anode material according to claim 1, wherein the graphite particles have a tap density of 0.6 to 1.4 g/cm$^3$.

7. The anode material according to claim 1, wherein the proportion of the crystalline carbon in the anode material is 1 to 14% by mass.

8. An anode material according to claim 1, wherein the anode results in an electrode density of 1.40 to 1.70 g/cm$^3$ when under a pressure of 100 to 400 kg/cm$^2$.

9. The anode material according to claim 1, which when formed by intercalation of lithium ion, provides a $^7$Li-nuclear magnetic resonance spectrum, using lithium chloride as a standard substance, that shows two peaks in the spectrum, and wherein the two peaks respectively represent (a) a lithium intercalated into graphite, showing a chemical shift at 40 to 50 ppm, and (b) lithium intercalated into crystalline carbon, showing a chemical shift at 10 to 20 ppm.

10. An anode material mixture for lithium secondary battery, comprising the anode material of claim 1 wherein the anode material is contained in an amount of at least 10% by mass.

11. A process for producing the anode material according to claim 1, which comprises:
- a first step of grinding a graphite of 5 mm or less in average particle diameter, using an impact grinder to produce graphite particles of 100 μm or less in average particle diameter, and wherein the interior of each particle comprises a bent laminate structure, and
- a second step of subjecting the graphite particles produced in the first step, to chemical vapor deposition in a fluidized bed type reaction furnace to form a crystalline carbon coating layer on the graphite particles.

12. The process according to claim 11, wherein in the first step, the graphite of 5 mm or less in average particle diameter is fed into the impact grinder together with a gas current.

13. The process according to claim 11, wherein in the second step, the chemical vapor deposition is conducted at a temperature of 850 to 1,200° C.

14. A lithium secondary battery, comprising the anode material according to claim 1.

15. A lithium secondary battery, comprising the anode material according to claim 2.

16. A lithium secondary battery, comprising the anode material according to claim 3.

17. A lithium secondary battery, comprising the anode material according to claim 4.

18. A lithium secondary battery, comprising the anode material according to claim 5.

19. A lithium secondary battery, comprising the anode material according to claim 6.

20. A lithium secondary battery, comprising the anode material according to claim 7.

21. A lithium secondary battery, comprising the anode material according to claim 8.

22. A lithium secondary battery, comprising the anode material according to claim 9.

23. A lithium secondary battery, comprising the anode material mixture according to claim 10.

* * * * *